US011312823B2

(12) United States Patent
Kadoki et al.

(10) Patent No.: US 11,312,823 B2
(45) Date of Patent: Apr. 26, 2022

(54) METHOD FOR PRODUCING POLYARYLENE SULPHIDE RESIN

(71) Applicant: DIC Corporation, Tokyo (JP)

(72) Inventors: Masaya Kadoki, Chihara (JP); Saori Nara, Chihara (JP); Taku Ibaraki, Chihara (JP); Hideki Watanabe, Chihara (JP); Satoshi Inoue, Chihara (JP)

(73) Assignee: DIC Corporation, Tokyo (JP)

( * ) Notice: Subject to any disclaimer, the term of this patent is extended or adjusted under 35 U.S.C. 154(b) by 298 days.

(21) Appl. No.: 16/622,964

(22) PCT Filed: Jun. 26, 2018

(86) PCT No.: PCT/JP2018/024120
§ 371 (c)(1),
(2) Date: Dec. 16, 2019

(87) PCT Pub. No.: WO2019/004171
PCT Pub. Date: Jan. 3, 2019

(65) Prior Publication Data
US 2021/0147630 A1 May 20, 2021

(30) Foreign Application Priority Data

Jun. 29, 2017 (JP) .............................. JP2017-127442
Apr. 2, 2018 (JP) .............................. JP2018-070829

(51) Int. Cl.
C08G 75/0259 (2016.01)
C08G 75/0213 (2016.01)
C08G 75/0254 (2016.01)
C08J 3/20 (2006.01)
C08J 5/00 (2006.01)

(52) U.S. Cl.
CPC ..... *C08G 75/0259* (2013.01); *C08G 75/0213* (2013.01); *C08G 75/0254* (2013.01); *C08J 3/203* (2013.01); *C08J 5/00* (2013.01); *C08J 2381/02* (2013.01)

(58) Field of Classification Search
CPC ............... C08J 2481/02; C08J 2481/04; C08J 2381/02; C08J 2381/04; C08J 5/00; C08J 3/005; C08J 3/02; C08J 3/03; C08J 3/05; C08J 3/07; C08G 75/14; C08G 75/16; C08G 75/025; C08G 75/0254; C08G 75/0259; C08G 75/0263; C08G 75/0268; C08G 75/0272; C08G 75/02; C08G 75/0204; C08G 75/0209; C08G 75/0213; C08G 75/0218; C08G 75/0222; C08G 75/0227; C08G 75/0231; C08G 75/0236; C08G 75/024; C08G 75/0245; C08L 101/00; C08L 101/12; C08L 81/00; C08L 81/02; C08L 81/04; B29K 2081/00; B29K 2081/04
See application file for complete search history.

(56) References Cited

U.S. PATENT DOCUMENTS

| | | | |
|---|---|---|---|
| 4,841,019 A | 6/1989 | Iwasaki et al. | |
| 5,194,580 A | 3/1993 | Koyama et al. | |
| 5,278,283 A * | 1/1994 | Miyoshi ............... | C08G 75/025 264/331.11 |
| 5,856,433 A | 1/1999 | Koyama et al. | |
| 2011/0319587 A1 | 12/2011 | Hinokimori | |
| 2014/0128568 A1 | 5/2014 | Hinokimori | |

FOREIGN PATENT DOCUMENTS

| | | |
|---|---|---|
| JP | 61-023627 A | 2/1986 |
| JP | H02-45531 A | 2/1990 |
| JP | 03-035023 A | 2/1991 |
| JP | 08-231723 A | 9/1996 |
| JP | 09-278888 A | 10/1997 |
| JP | 2004-107567 A | 4/2004 |
| WO | 2010/058713 A1 | 5/2010 |
| WO | 2015/033855 A1 | 3/2015 |

OTHER PUBLICATIONS

International Search Report dated Sep. 25, 2018, issued for PCT/JP2018/024120.

* cited by examiner

*Primary Examiner* — Christopher M Rodd
(74) *Attorney, Agent, or Firm* — Locke Lord LLP

(57) ABSTRACT

Provided is a method for producing a polyarylene sulfide resin, the method including subjecting a dihaloaromatic compound and a sulfidizing agent to a polymerization reaction in the presence of an aliphatic cyclic compound having a ring openable by hydrolysis, in which corrosion of a production apparatus is suppressed. More particularly, provided is a method for producing a polyarylene sulfide resin, the method including a dehydration step (1) in which a water-containing sulfidizing agent and an aliphatic cyclic compound having a ring openable by hydrolysis are heated in the presence of a dihaloaromatic compound to a liquid temperature in the range of 90° C. or higher and 170° C. or lower under the atmospheric pressure, and then dehydration is performed while maintaining the liquid temperature and reducing the pressure to a pressure in the range of 30 [kPa abs] or higher and 80 [kPa abs] or lower to thus obtain a mixture.

11 Claims, No Drawings

METHOD FOR PRODUCING POLYARYLENE SULPHIDE RESIN

TECHNICAL FIELD

The present invention relates to a method for efficiently producing a linear, high molecular weight polyarylene sulfide resin.

BACKGROUND ART

Polyarylene sulfide resins (hereinafter sometimes abbreviated as "PAS resins") typified by a polyphenylene sulfide resin (hereinafter sometimes abbreviated as "PPS resin") are excellent in heat resistance, chemical resistance, and the like and are widely used for electric and electronic components, car components, components of a hot water supplier, fibers, films, and other applications.

A known example of a method for producing a polyarylene sulfide resin is a method in which a hydrous alkali metal sulfide or less than 1 mol of N-methyl pyrrolidone per mole of the hydrous alkali metal sulfide, and a polyhaloaromatic compound are mixed, the mixture is azeotropically dehydrated to obtain a slurry containing a particulate anhydrous alkali metal sulfide, and the slurry is then heated to perform a polymerization reaction (see, for example, PTLs 1 and 2). The method can efficiently produce a high molecular weight polyarylene sulfide resin by conducting a polymerization reaction after removing a small amount of water, such as water of crystallization, remaining in the reaction system in which water may induce side reactions. However, since a highly basic sulfidizing agent is required to be dehydrated at a high temperature, a reaction apparatus, such as a reaction container, is liable to corrode in a contact part with raw materials. Thus, a member formed of a metal resistant to corrosion, such as titanium and zirconium, is required to be used. Nevertheless, it has been known that even such a metallic member corrodes and exhaustion of the metallic member is promoted. Thus, there has been desired a method for producing a polyarylene sulfide resin, in which exhaustion of such metallic members is suppressed.

Furthermore, the obtained polyarylene sulfide resin contains metallic member-derived metal atoms eluted due to exhaustion of the metallic member at the contact part, and it has been difficult to remove the metal atoms by a normal washing operation. In particular, the thickness of a molded article produced using such a polyarylene sulfide resin has been decreased in recent years and a polyarylene sulfide resin that has a higher quality than before has been desired. Thus, it has been an urgent task to decrease the content of metal atoms derived from a reaction apparatus in a polyarylene sulfide resin.

CITATION LIST

Patent Literature

PTL 1: JP-A-8-231723
PTL 2: WO2010/058713

SUMMARY OF INVENTION

Technical Problem

Thus, a problem that the present invention is to solve is to provide a method for producing a polyarylene sulfide resin, the method including subjecting a dihaloaromatic compound and a sulfidizing agent to a polymerization reaction in the presence of an aliphatic cyclic compound having a ring openable by hydrolysis, in which corrosion of a production apparatus is suppressed to decrease the content of metal atoms derived from the production apparatus in the obtained polyarylene sulfide resin.

Solution to Problem

As a result of an intensive studies for solving the above problem, the present inventors has found that, when the dehydration of a water-containing sulfidizing agent and an aliphatic cyclic compound having a ring openable by hydrolysis in the presence of a dihaloaromatic compound is performed under a reduced pressure, the corrosion of the contact part can be reduced as compared with before, in other words, as compared with the case where dehydration is performed under the atmospheric pressure, and the content of metal atoms derived from a production apparatus in the obtained polyarylene sulfide resin can be decreased, thus completing the present invention.

Specifically, the present invention relates to a method for producing a polyarylene sulfide resin in which a dihaloaromatic compound is reacted with a sulfidizing agent in the presence of an aliphatic cyclic compound having a ring openable by hydrolysis, a method for producing a polyarylene sulfide resin in which a dihaloaromatic compound is reacted with a sulfidizing agent in the presence of an aliphatic cyclic compound having a ring openable by hydrolysis, the method including a dehydration step (1) in which a water-containing sulfidizing agent and an aliphatic cyclic compound having a ring openable by hydrolysis are heated in the presence of a dihaloaromatic compound to a liquid temperature in the range of 90° C. or higher to 170° C. or lower under the atmospheric pressure and then dehydration is performed while maintaining the liquid temperature and reducing the pressure to a pressure in the range of 30 [kPa abs] or higher and 80 [kPa abs] or lower to thus obtain a mixture.

The present invention further relates to a method for producing a polyarylene sulfide resin composition, the method including a step of producing a polyarylene sulfide resin by the production method described above and a step of blending the obtained polyarylene sulfide resin with at least one other component selected from the group consisting of a filler, a thermoplastic resin other than the polyarylene sulfide resin, an elastomer, a crosslinkable resin having two or more functional groups, and a silane coupling agent, heating the blend to the melting point of the polyarylene sulfide resin or higher, and performing melt-kneading.

The present invention further relates to a method for producing a polyarylene sulfide resin molded article, the method including a step of producing a polyarylene sulfide resin composition by the production method described above and a step of subjecting the obtained polyarylene sulfide resin composition to melt-molding.

Advantageous Effects of Invention

According to the present invention, there can be provided a method for producing a polyarylene sulfide resin, the method including subjecting a dihaloaromatic compound and a sulfidizing agent to a polymerization reaction in the presence of an aliphatic cyclic compound having a ring openable by hydrolysis, in which corrosion of a production apparatus is suppressed to decrease the content of metal atoms derived from the production apparatus in the obtained polyarylene sulfide resin.

DESCRIPTION OF EMBODIMENTS

The method for producing a polyarylene sulfide resin of the present invention is
a method for producing a polyarylene sulfide resin in which a dihaloaromatic compound is reacted with a sulfidizing agent in the presence of an aliphatic cyclic compound having a ring openable by hydrolysis,
the method is characterized by including a dehydration step (1) in which a water-containing sulfidizing agent and an aliphatic cyclic compound having a ring openable by hydrolysis are heated in the presence of a dihaloaromatic compound to a liquid temperature in the range of 90° C. or higher and 170° C. or lower under the atmospheric pressure, and then dehydration is performed while maintaining the liquid temperature and reducing the pressure to a pressure in the range of 30 [kPa abs] or higher and 80 [kPa abs] or lower to thus obtain a mixture. The method will be described in detail below.

Dehydration Step (1)

The present invention essentially includes a dehydration step (1) in which a water-containing sulfidizing agent and an aliphatic cyclic compound having a ring openable by hydrolysis are heated in the presence of a dihaloaromatic compound to a liquid temperature in the range of 90° C. or higher and 170° C. or lower under the atmospheric pressure and then dehydration is performed while maintaining the liquid temperature and reducing the pressure to a pressure in the range of 30 [kPa abs] or higher and 80 [kPa abs] or lower to thus obtain a mixture.

The dehydration step (1) is a step in which a water-containing sulfidizing agent is reacted with an aliphatic cyclic compound having a ring openable by hydrolysis while conducting dehydration in the presence of a dihaloaromatic compound. According to this step, while the amount of water present at the time in the reaction system is effectively removed out of the system, hydrolysis of the aliphatic cyclic compound is promoted, thus forming a mixture containing at least an anhydrous sulfidizing agent and an alkali metal salt of a hydrolysate of the aliphatic cyclic compound. In the present invention, by performing dehydration under a reduced pressure, corrosion at a contact part of a reaction apparatus with raw materials or a mixture thereof can be reduced as compared with the case of under a pressure condition of the atmospheric pressure or higher, and the content of metal atoms derived from the contact part in the obtained polyarylene sulfide resin can be decreased.

The dihaloaromatic compound used in the present invention acts in the dehydration step (1) as a solvent which secures fluidization of the obtained mixture, and in a subsequent polymerization step, can be used as a polymerization raw material. Examples of dihaloaromatic compounds used in the present invention include p-dihalobenzene, m-dihalobenzene, o-dihalobenzene, 2,5-dihalotoluene, 1,4-dihalonephthalene, 1-methoxy-2,5-dihalobenzene, 4,4'-dihalobiphenyl, 3,5-dihalobenzoic acid, 2,4-dihalobenzoic acid, 2,5-dihalonitrobenzene, 2,4-dihalonitrobenzene, 2,4-dihaloanisole, p,p'-dihalodiphenyl ether, 4,4'-dihalobenzophenone, 4,4'-dihalodiphenylsulfone, 4,4'-dihalodiphenylsulfoxide, 4,4'-dihalodiphenylsulfide, and compounds that have an alkyl group having 1 to 18 carbon atoms as a nucleic substituent on the aromatic ring of the above compounds. Note that the halogen atom contained in the above compounds is desirably a chlorine atom or a bromine atom, and the halogen atom is particularly desirably a chlorine atom.

When a linear polyarylene sulfide resin is to be efficiently produced, among the dihaloaromatic compounds, p-dichlorobenzene, m-dichlorobenzene, 4,4'-dichlorobenzophenone, and 4,4'-dichlorodiphenylsulfone are preferred in terms of good mechanical strength and moldablity of the finally obtained polyarylene sulfide resin, and p-dichlorobenzene is particularly preferred.

In addition, when a portion of the polymer structure of a linear polyarylene sulfide resin is desired to have a branched structure, 1,2,3-trihalobenzene, 1,2,4-trihalobenzene, 1,3,5-trihalobenzene, 1,2,3,5-tetrahalobenzene, 1,2,4,5-tetrahalobenzene, or 1,4,6-trihalonephthalene is preferably used together in place of a part of the dihaloaromatic compound. Note that the halogen atom contained in the above compounds is also desirably a chlorine atom or a bromine atom, and is particularly desirably a chlorine atom. Such a compound, if used together, is preferably used in an amount in the range of 0.001 mol or more and 3 mol or less based on 100 mol of the dihaloaromatic compound while watching for gelation.

In the dehydration step (1), the amount of the dihaloaromatic compound added is in the range of preferably 0.2 mol or more, more preferably 0.3 mol or more and preferably 5.0 mol or less, more preferably 2.0 mol or less per mole of sulfur atoms in the sulfidizing agent. An amount of 0.2 mol or more is preferred from the viewpoint of securing fluidity of the mixture, and an amount of 5.0 mol or less is preferred from the viewpoint of suppressing the total heat required for heating to increase productivity.

Examples of sulfidizing agents for use in the present invention include an alkali metal sulfide, or an alkali metal hydrosulfide and an alkali metal hydroxide. An alkali metal sulfide or an alkali metal hydrosulfide is generally used as a so-called hydrate containing water of crystallization when used as a raw material of a polyarylene sulfide resin, and in this case, a liquid form or solid form hydrate having a solid concentration in the range of preferably 10% by mass or more, more preferably 35% by mass or more and preferably 80% by mass or less, more preferably 65% by mass or less is used.

Examples of alkali metal sulfides for use in the present invention include lithium sulfide, sodium sulfate, potassium sulfide, rubidium sulfide, cesium sulfide, and other compounds. The compounds may be used alone and in combination of two or more thereof. Among the alkali metal sulfides, sodium sulfate and potassium sulfide are preferred and sodium sulfate is particularly preferred.

In addition, an alkali metal sulfide can be obtained by reacting an alkali metal hydrosulfide with an alkali metal hydroxide, and an alkali metal sulfide prepared in the same reaction system as in the dehydration step (1) may be used or an alkali metal sulfide previously prepared in a reaction system different from that of the dehydration step (1) may be used. Specific examples of alkali metal hydroxides include lithium hydroxide, sodium hydroxide, potassium hydroxide, rubidium hydroxide, and cesium hydroxide. Among them, lithium hydroxide, sodium hydroxide, and potassium hydroxide are preferred and sodium hydroxide is particularly preferred. An alkali metal hydroxide is preferably used in the form of aqueous solution and the concentration is preferably in the range of 10% by mass or more and 50% by mass or less. In addition, examples of alkali metal hydrosulfides for use in the present invention include lithium hydrosulfide, sodium hydrosulfide, potassium hydrosulfide, rubidium hydrosulfide, and hydrosulfide cesium. The compounds may be used alone or in combination of two or more thereof. Among the alkali metal hydrosulfides, sodium hydrosulfide and potassium hydrosulfide are preferred and sodium hydrosulfide is particularly preferred. In addition, an alkali metal hydrosulfide can also be obtained by reacting hydrogen sulfide with an alkali metal hydroxide, and alkali metal hydrosulfide previously prepared outside the reaction system may be used.

As an aliphatic cyclic compound for used in the present invention, any known aliphatic cyclic compound that has a ring openable by hydrolysis can be used with no particular limitation. Specific examples of such aliphatic cyclic compounds include aliphatic cyclic amide compounds, such as N-methyl-2-pyrrolidone (hereinafter sometimes abbreviated as NMP), N-cyclohexyl-2-pyrrolidone, N-methyl-ε-caprolactam, formamide, acetoamide, N-methylformamide, N,N-dimethylacetamide, 2-pyrrolidone, ε-caprolactam, hexamethylphosphoramide, tetramethylurea, N-dimethylpropylene urea, and 1,3-dimethyl-2-imidazolidinone acid, amide urea, and lactams. Among them, an aliphatic cyclic amide compound, in particular, NMP is preferred in terms of good reactivity.

In this case, the amount of the aliphatic cyclic compound charged is preferably in the range of 0.01 mol or more and 4.0 mol or less based on 1 mol of sulfur atoms in the sulfidizing agent, and when a high molecular weight polyarylene sulfide resin is to be produced, the amount is preferably in the range of 0.01 or more and 0.9 mol or less, more preferably less than 0.9 mol, and further preferably 0.5 mol or less based on 1 mol of sulfur atoms in the sulfidizing agent.

In the dehydration step (1), the dehydration is allowed to proceed under a reduced pressure. More specifically, the following method is exemplified: (1) in the presence of a dihaloaromatic compound, a water-containing sulfidizing agent and an aliphatic cyclic compound having a ring openable by hydrolysis are heated to a liquid temperature in the range of preferably 90° C. or higher, more preferably 110° C. or higher, further preferably 120° C. or higher, particularly preferably higher than 130° C., most preferably 140° C. or higher and preferably 170° C. or lower, more preferably 160° C. or lower, further preferably 150° C. or lower under the atmospheric pressure, and then dehydration is performed by reducing the pressure to a pressure in the range of preferably 30 [kPa abs] or higher, more preferably 35 [kPa abs] or higher, further preferably 40 [kPa abs] or higher and preferably 80 [kPa abs] or lower, more preferably 70 [kPa abs] or lower, further preferably 60 [kPa abs] or lower while maintaining the liquid temperature.

In the method, dehydration is preferably conducted by controlling the pressure in the range of the atmospheric pressure to a predetermined pressure so that the liquid temperature is preferably maintained in the range of ±10° C., more preferably in the range of ±5° C. in the dehydration. The pressure gradient in this case cannot be unconditionally defined since it depends on the volume of the reaction container, the total amount of the raw materials, and the like. However, the pressure gradient is preferably in the range of more than −3 [kPa abs/min], more preferably in the range of −2 [kPa abs/min] or more, and further preferably in the range of −1 [kPa abs/min] or more. On the other hand, the upper limit is not particularly set, but from the viewpoint of the productivity, the pressure gradient is in the range of preferably −0.001 [kPa abs/min] or less, more preferably −0.01 [kPa abs/min] or less.

In the above method, adjustment of the liquid temperature is performed by, while measuring the liquid temperature, controlling the pressure so that the liquid temperature is a temperature to be maintained. When the temperature comes out of the range of temperature to be maintained, the quantity of heat charged from a heater into the reaction system can be controlled. The temperature can be manually controlled but is preferably automatically controlled by a known controlling method, such as a sequence control, a feedback control, or a feed-forward control. Since control inevitably involves a time lag, a width of temperature is acceptable between a liquid temperature to be controlled and a true liquid temperature. The width of temperature is preferably in the range of ±10° C. of the temperature to be controlled and more preferably in the range of ±5° C.

The dehydration is performed by distilling a mixture of an aliphatic cyclic compound, water, and a dihaloaromatic compound with a valve of a pipe from the reaction system to a distillation apparatus opened while controlling the liquid temperature and pressure within the above ranges. An example of a method of the distillation is a method in which after the aliphatic cyclic compound is isolated, a mixed vapor mainly containing water and the dihaloaromatic compound is condensed with a condenser, water and the dihaloaromatic compound are separated with a decanter or the like, and an azeotropically distilled dihaloaromatic compound is returned to the reaction system. Note that, although the isolated aliphatic cyclic compound, and the dihaloaromatic compound separated from the aliphatic cyclic compound and water, are preferably returned to the reaction system, when not returned, the aliphatic cyclic compound or the dihaloaromatic compound of an amount corresponding to the amount azeotropically distilled may be additionally charged, or an excess of the aliphatic cyclic compound or dihaloaromatic compound may be charged in advance taking into account the amount azeotropically distilled.

Thus, the dehydration step (1) of the present invention is a step in which while water is discharged out of the reaction system by a dehydration treatment, an aliphatic cyclic compound having a ring openable by hydrolysis is hydrolyzed and at the same time an anhydrous sulfidizing agent, preferably an anhydrous alkali metal sulfide is produced. When an excess of water exists in the reaction system after the dehydration treatment, a large amount of by-products are produced in a subsequent polymerization step to induce a growth end termination reaction and to tend to inhibit a chain length extending reaction of a polyarylene sulfide resin, and in turn inhibit increase in the viscosity or increase in the molecular weight. Accordingly, the amount of all water in the reaction system after the dehydration step (1) is preferably as small as possible, and specifically, the amount of water is preferably in the range of more than 0.1 mol, more preferably 0.6 mol or more and preferably 0.99 mol or less, more preferably 0.96 mol or less per mole of sulfur atoms in the sulfidizing agent used in the dehydration step (1). Here, the "amount of all water in a reaction system" means the total mass of all of water consumed in hydrolysis of the aliphatic cyclic compound, a small amount of water of crystallization remaining in the sulfidizing agent, and other water present in the reaction system.

Furthermore, the amount of water present at the time in the reaction system after the dehydration step (1) is preferably in the range of 0.4 mol or less per mole of sulfur atoms in the sulfidizing agent in the reaction system, more preferably in the range of the detection limit to 0.4 mol or less, and as a range that provides superior efficiency of the dehydration, the amount of water is further preferably in the range of 0.03 mol or more and 0.11 mol or less. Here, the "amount of water present at the time in a reaction system" is the amount of all water in the reaction system except for water consumed in hydrolysis of the aliphatic cyclic compound, that is, the total amount of water that is present at the time in the reaction system as water of crystallization, $H_2O$, and the like (hereinafter referred to as "water of crystallization and the like").

As described above, in the present invention, dehydration is allowed to proceed under a reduced pressure, and thus release of water of crystallization in a sulfidizing agent is promoted even in a lower heating temperature to efficiently remove water in the reaction system which causes side reactions in a polymerization step, and an aliphatic cyclic compound is also converted to a hydrolysate which is considered to have an action of promoting polymerization, resulting in suppression of side reactions during polymerization as well as promotion of polymerization.

Dehydration Step (2)

The present invention may include as an optional step a dehydration step (2) in which an aprotic polar organic solvent is further added to the mixture obtained in the dehydration step (1) and water is removed by distillation to perform dehydration. In the dehydration step (2), the aprotic polar solvent is preferably added to the reaction system in an amount in the range of 0.5 mol or more and 5 mol or less based on 1 mol of sulfur atoms in the sulfidizing agent. If the amount of water present at the time in the reaction system is to be in the range less than 0.03 mol based on 1 mol of sulfur atoms in the sulfidizing agent, the efficiency of dehydration tends to be greatly decreased. Thus, in such a case, by further performing the dehydration step (2) subsequent to the dehydration step (1), the amount of water contained in the reaction system at the completion of the dehydration step (2) can be adjusted to an amount in the range less than 0.03 mol based on 1 mol of sulfur atoms in the sulfidizing agent, preferably in the range of the detection limit or more and less than 0.03 mol, and further preferably in the range of the detection limit or more and 0.01 mol or less.

The dehydration in the dehydration step (2) can be performed under conditions of a liquid temperature in the range of 90° C. or higher and 220° C. or lower and a pressure in the range of 30 [kPa abs] or higher and 202 [kPa abs] or lower, and in such conditions, a condition for a dehydration treatment under a reduced pressure which is the same as in the dehydration step (1) is preferred. Specifically, the dehydration is preferably performed with heating so that the liquid temperature is in the range of preferably 90° C. or higher, more preferably 110° C. or higher, further preferably 130° C. or higher and 160° C. or lower, more preferably 150° C. or lower, and while reducing the pressure to a pressure in the range of preferably 30 [kPa abs] or higher, more preferably 35 [kPa abs] or higher, further preferably 40 [kPa abs] or higher and preferably 80 [kPa abs] or lower, more preferably 70 [kPa abs] or lower, further preferably 60 [kPa abs] or lower, from the viewpoint that dehydration can be efficiently performed at a lower liquid temperature.

Note that the dehydration step (2) is preferably performed in the same reaction container as for the dehydration step (1) from the viewpoints of sharing production equipment to increase productivity, whereas it is also preferred that the dehydration step (2) is performed using a reaction container different from that for the dehydration step (1) and a polymerization step from the viewpoint of increasing resin production per unit time.

Polymerization Step

The present invention subsequently includes a polymerization step in which the mixture obtained through the dehydration step (1) is heated with an amount of water present at the time in the reaction system in the range of 0.4 mol or less based on 1 mol of the dihaloaromatic compound to perform a polymerization reaction. In addition, when the dehydration step (2) is performed after the dehydration step (1), the mixture obtained through the dehydration step (2) can be heated with an amount of water present at the time in the reaction system in the range less than 0.03 mol based on 1 mol of the dihaloaromatic compound to perform a polymerization reaction.

The polymerization step is a step in which a mixture obtained through the dehydration step (1) or the dehydration step (2) is heated to a temperature in the range of 200° C. or higher and 300° C. or lower in a sealed reaction container to thereby promote a polymerization reaction.

In the polymerization step, the conditions of the polymerization reaction are not particularly limited, but the reaction is preferably performed at a temperature at which the polymerization reaction can easily proceed, that is, a temperature in the range of 200° C. or higher and 300° C. or lower, preferably in the range of 210° C. or higher and 280° C. or lower, further preferably in the range of 215° C. or higher and 250° C. or lower.

Since the dihaloaromatic compound which is a raw material for polymerization is charged in the dehydration step (1) and is azeotropically removed by distillation as described above, an excess of the dihaloaromatic compound is charged in advance in the dehydration step taking the amount azeotropically distilled into account or the dihaloaromatic compound is additionally charged before the polymerization step is started so that the reaction can be performed in the state where the amount of the dihaloaromatic compound in the reaction system is preferably in the range of 0.8 mol or more, more preferably 0.9 mol or more and preferably 1.2 mol or less, more preferably 1.1 mol or less based on 1 mol of sulfur atoms in the sulfidizing agent, and is particularly preferably equal by mole to the amount of the sulfur atoms.

A smaller amount of water present in a reaction system at the time when the polymerization starts is more preferred, and, for example, the amount is in the range of 0.4 mol or less, preferably in the range of the detection limit (mol) or more and preferably 0.4 mol or less, more preferably 0.11 mol or less, further preferably 0.08 mol or less, particularly preferably 0.03 mol or less, most preferably 0.01 mol or less per mole of sulfur atoms in the sulfidizing agent. Water is produced as the polymerization reaction proceeds, and thus at the time when the polymerization reaction completes in the polymerization step, water in the range of 0.1 mol or more and 0.3 mol or less is preferably produced per mole of sulfur atoms in the sulfidizing agent, and further, this range is preferably satisfied after the ratio of conversion of the dihaloaromatic compound exceeds 80% by mole, more preferably after the ratio of conversion exceeds 60% by mole, further preferably immediately after the start of the polymerization.

Here, the ratio of conversion of the dihaloaromatic compound is represented by the following formula.

Ratio of conversion (%)=(charge amount−remaining amount)/charge amount×100

Note that the "charge amount" represents the mass of the dihaloaromatic compound charged in the reaction system, and the "remaining amount" represents the mass of the dihaloaromatic compound remaining in the reaction system.

Post-Treatment Step

The reaction mixture containing the polyarylene sulfide resin obtained by the polymerization reaction can be subjected to a post-treatment step. The method of the post-treatment step may be any known method and is not particularly limited, and examples include a method in which, after the completion of the polymerization reaction, the solvent is first removed by distillation from the reaction mixture as it is or with an acid or a base added thereto under a reduced pressure or normal pressure, and then solid obtained after the solvent distillation is washed once or two or more times with a solvent, such as water, acetone, methyl ethyl ketone, or an alcohol, and is further neutralized, washed with water, filtered, and dried, or a method in which, after the completion of the polymerization reaction, a solvent, such as water, acetone, methyl ethyl ketone, an alcohol, an ether, a halogenated hydrocarbon, an aromatic hydrocarbon, or an aliphatic hydrocarbon (a solvent that is soluble in the polymerization solvent used and that is a poor solvent relative to at least the polyarylene sulfide resin) is added as a sedimentation agent to the reaction mixture to settle solid products, such as a polyarylene sulfide resin and an inorganic salt, and the solid products are filtered, washed, and dried, or a method in which, after the completion of the polymerization reaction, the reaction solvent (or an organic solvent having an equal solubility of a low molecular weight polymer) is added to the reaction mixture, the mixture is stirred, and then is filtered to remove low molecular weight polymers, and the resultant is then washed with a solvent, such as water, acetone, methyl ethyl ketone, or an alcohol, once or two or more times, and is subsequently neutralized, washed with water, filtered, and dried.

Note that in such a post-treatment method as mentioned above, a polyarylene sulfide resin may be dried in vacuum, or may be dried in the air or an atmosphere of inert gas, such as nitrogen.

The polyarylene sulfide resin obtained in this manner can be used as it is as a material for various molding, or may be subjected to a heat treatment in the air or an oxygen-enriched air, or under a reduced pressure condition to cause oxidation crosslinking. The temperature of the heat treatment is different according to the desired time of the crosslinking treatment and the atmosphere during the treatment, but is preferably in the range of 180° C. or higher and 270° C. or lower. In addition, the heat treatment may be conducted using an extruder or the like in a state where the polyarylene sulfide resin is melted at the melting point of the polyarylene sulfide resin or higher, but is preferably conducted at the melting point plus 100° C. or lower since a higher temperature leads to a higher tendency of thermal degradation of the polyarylene sulfide resin.

Production Apparatus

In the method for producing a polyarylene sulfide resin of the present invention, the reaction apparatus used in the above steps is preferably an apparatus in which a portion or the whole of a contact part thereof with raw materials, specifically a dihaloaromatic compound, a sulfidizing agent, an alkali catalyst and the like, and an aliphatic cyclic compound having a ring openable by hydrolysis, a mixture obtained through a dehydration step, and a polymerization reaction product containing a polyarylene sulfide resin obtained after a polymerization reaction is formed of a titanium, zirconium, or nickel alloy, from the viewpoint of corrosion resistance.

Examples of such reaction apparatuses include a reaction container (polymerization line), such as a batch-type reaction container (autoclave, reaction tank) including an impeller therein or a continuous reaction container, an impeller, and a baffle.

For example, a batch-type reaction container may be any container that can hold raw materials, a mixture, or a polymerization reaction product inside the reaction container. An example is a container that has a structure composed of an upper lid, a body, and a bottom and that can be sealed as required. A container having a structure including therein an impeller, a shaft that transmits power to the impeller, a baffle, and a temperature controlling corrugated tube is preferred in terms of superior stirring efficiency. Here, examples of impellers include an anchor impeller, a turbine impeller, a screw impeller, and a double helical impeller. Baffle is preferably built so that the bottom end thereof is near the bottom of the reaction container while the upper end thereof is out of a liquid surface from the viewpoint of easy thermal conduction and thermal control.

On the other hand, an example of a continuous reaction container is a tubular reactor in which a plurality of mixing elements having no movable part are fixed therein, and an example of such a container is a container having formed a polymerization line in which the tubular reactors are directly connected, or a continuous circular polymerization line having a structure in which a plurality of tubular reactors are connected and a portion of reaction liquid is returned to a raw material inlet port of the tubular reactors. Such a continuous reaction container can achieve feed of raw materials and transfer of reaction liquid by a plunger pump or the like.

In addition, the reaction container is further provided with various measurement devices, such as a thermometer, a pressure gauge, and a safety valve. On the outside of the reaction container, a pipe and an on-off valve coupled to a vapor device, distillation devices, such as a condenser, a decanter, a distillate (an organic layer component of the decanter)-returning line, and a distillate (an aqueous layer component of the decanter)-removal line, pressure reduction devices, such as a pressure control valve, a vacuum pump, and a hydrogen sulfide-trapping device are preferably disposed.

A reaction apparatus for use in the present invention may be an apparatus in which at least a portion, preferably the whole of the contact part is formed of the nickel alloy. In view of the corrosion resistance, the nickel alloy used here is preferably an alloy composed of chromium in a content in the range of 43% by mass or more to 47% by mass or less, molybdenum in a content in the range of 0.1% by mass or more and 2% by mass or less, and the balance of nickel and inevitable impurities. Tungsten, iron, cobalt, and copper are preferably contained in a content of the detection limit or lower. Note that the term "inevitable impurities" as used in the present invention means a trace of impurities that are difficult to technically remove. In the present invention, an example of such an impurity is carbon atoms contained in an alloy in a content of 3% by mass or less, preferably 1% by mass or less, more preferably the detection limit or less.

Mold-Processing or the Like

The polyarylene sulfide resin obtained by the production method of the present invention as described in detail above can be subjected to a step of blending the polyarylene sulfide resin with at least one other component selected from the group consisting of a filler, a thermoplastic resin other than the polyarylene sulfide resin, an elastomer, a crosslinkable resin having two or more functional groups, and a silane coupling agent, heating the blend to the melting point of the polyarylene sulfide resin or higher, and performing melt kneading, thereby producing a polyarylene sulfide resin composition.

The filler is not particularly limited, but examples include a fibrous filler and an inorganic filler. Examples of usable fibrous fillers include a glass fiber, a carbon fiber, a silane glass fiber, a ceramic fiber, an aramid fiber, a metal fiber, fibers of potassium titanate, silicon carbide, calcium sulfate, and calcium silicate, and a natural fiber, such as wollastonite. In addition, examples of usable inorganic fillers include barium sulfate, calcium sulfate, clay, pyrophyllite, bentonite, sericite, zeolite, mica, mica (unmo), talc, attapulgite, ferrite, calcium silicate, calcium carbonate, magnesium carbonate, and glass bead. In addition, various additives, such as a mold release agent, a colorant, a thermal stabilizer, an ultraviolet stabilizer, a foaming agent, an anti-rust agent, a flame retardant, and a lubricant can be incorporated as an additive in mold-processing.

Furthermore, examples of thermoplastic resins other than the polyarylene sulfide resin to be incorporated in the polyarylene sulfide resin composition of the present invention include synthetic resins, such as polyester, polyamide, polyimide, polyether imide, polycarbonate, polyphenylene ether, polysulfone, polyether sulfone, polyether ether ketone, polyether ketone, polyarylene, polyethylene, polypropylene, polyethylene tetrafluoride, polyethylene difluoride, polystyrene, an ABS resin, an epoxy resin, a silicone resin, a phenol resin, an urethane resin, and a liquid crystal polymer, and a polyarylene sulfide resin composition having such a resin incorporated therein may be used. The ratio of incorporation of the thermoplastic resin other than the polyarylene sulfide resin is preferably in the range of 1 part by mass or more, more preferably 3 parts by mass or more, further preferably 5 parts by mass or more and preferably 300 parts by mass or less, more preferably 100 parts by mass or less, furthermore preferably 45 parts by mass or less based on 100 parts by mass of the polyarylene sulfide resin. With a content of a thermoplastic resin other than the polyarylene sulfide resin in this range, an effect of further increasing heat resistance, chemical resistance, and mechanical properties can be obtained.

An example of an elastomer to be incorporated in the polyarylene sulfide resin composition of the present invention is a thermoplastic elastomer. Examples of thermoplastic elastomers include a polyolefin elastomer, a fluoro-elastomer, and a silicone-based elastomer. Note that a thermoplastic elastomer, as used herein, is categorized not as the thermoplastic resin but as an elastomer.

Such an elastomer (particularly a thermoplastic elastomer) preferably has a functional group that can react with a hydroxy group or an amino group. Accordingly, a resin composition that is particularly superior in adhesiveness and impact resistance can be obtained. Examples of such functional groups include an epoxy group, a carboxy group, an isocyanate group, an oxazoline group, and a group represented by the formula: R(CO)O(CO)— or R(CO)O— (wherein R represents an alkyl group having 1 to 8 carbon atoms). A thermoplastic elastomer having such a functional group can be obtained by copolymerization of, for example, α-olefin and a vinyl polymerizable compound having the functional group. Examples of α-olefins include α-olefins having 2 to 8 carbon atoms, such as ethylene, propylene, and butene-1. Examples of vinyl polymerizable compound having the functional group include α,β-unsaturated carboxylic acid and an alkyl ester thereof, such as (meth) acrylic acid and (meth) acrylic acid ester, maleic acid, fumaric acid, itaconic acid, other α,β-unsaturated carboxylic acids having 4 to 10 carbon atoms, and derivatives thereof (mono- or diester, and acid anhydrides thereof), and glycidyl (meth) acrylate. Among them, an ethylene-propylene copolymer and an ethylene-butene copolymer that have at least one functional group selected from the group consisting of an epoxy group, a carboxy group, and a group represented by the formula: R(CO)O(CO)— or R(CO)O— (wherein R represents an alkyl group having 1 to 8 carbon atoms) are preferred in terms of increased toughness and impact resistance.

The ratio of incorporation of an elastomer cannot be unconditionally defined since it depends on the kind and use purpose thereof, but, for example, is preferably in the range of 1 parts by mass or more, more preferably 3 parts by mass or more, further preferably 5 parts by mass or more and preferably 300 parts by mass or less, more preferably 100 parts by mass or less, furthermore preferably 45 parts by mass or less based on 100 parts by mass of the polyarylene sulfide resin. With a content of an elastomer in this range, a further superior effect is obtained in terms of securing heat resistance and toughness of a molded article.

A crosslinkable resin to be incorporated in the polyarylene sulfide resin composition has two or more functional groups. Examples of functional groups include an epoxy group, a phenolic hydroxy group, an amino group, an amide group, a carboxy group, an acid anhydride group, and an isocyanate group. Examples of crosslinkable resins include an epoxy resin, a phenol resin, and a urethane resin.

The amount of the crosslinkable resin incorporated is in the range of preferably 1 parts by mass or more, more preferably 3 parts by mass or more, further preferably 5 parts by mass or more and preferably 300 parts by mass or less, more preferably 100 parts by mass or less, furthermore preferably 30 parts by mass or less based on 100 parts by mass of the polyarylene sulfide resin. With an amount of a crosslinkable resin incorporated in this range, an effect of increasing rigidity and heat resistance of a molded article is particularly significantly obtained.

Examples of silane coupling agents to be incorporated in the polyarylene sulfide resin composition of the present invention include γ-glycidoxypropyltrimethoxysilane, γ-glycidoxypropyltriethoxysilane, β-(3,4-epoxycyclohexyl)ethyltrimethoxysilane, γ-glycidoxypropylmethyldiethoxysilane, and γ-glycidoxypropylmethyldimethoxysilane.

The amount of a silane compound incorporated is, for example, in the range of preferably 0.01 parts by mass or more, more preferably 0.1 parts by mass or more and preferably 10 parts by mass or less, more preferably 5 parts by mass or less based on 100 parts by mass of the polyarylene sulfide resin. With an amount of a silane compound incorporated in this range, an effect of increasing compatibility of the polyarylene sulfide resin with the other components.

The polyarylene sulfide resin composition of the present invention may further contain other additives, such as a mold release agent, a colorant, a thermal stabilizer, an ultraviolet stabilizer, a foaming agent, an anti-rust agent, a flame retardant, and a lubricant. The amount of the additives incorporated is, for example, preferably in the range of 1 part by mass or more and 10 parts by mass or less based on 100 parts by mass of the polyarylene sulfide resin.

The polyarylene sulfide resin composition can be obtained in the form of, for example, a pellet-like compound or the like by a method in which the polyarylene sulfide resin obtained by the method described above is melt-kneaded with the other components. The temperature during melt-kneading is, for example, in the range of preferably 250° C.

or higher, more preferably 290° C. or higher and preferably 350° C. or lower, more preferably 330° C. or lower. The melt-kneading can be performed using a twin screw extruder or the like.

The polyarylene sulfide resin composition according to this embodiment can be processed into a molded article superior in heat resistance, mold-processability, size stability, and the like by melt-molding the composition alone or in combination with materials, such as the other components mentioned above, by various melt-processing methods, such as injection molding, extrusion, compression molding, and blow molding. The polyarylene sulfide resin composition of the present invention allows for easy production of a high quality molded article, particularly a thin molded article superior in insulation because of a small metal content.

The polyarylene sulfide resin and the composition thereof obtained in the production methods of the present invention, which also have characteristics inherent in polyarylene sulfide resins, such as heat resistance and size stability, can be widely used, for example, as a material for various mold-processing, such as injection molding, compression molding, extrusion molding of a composite, sheet, pipe, and the like, or pultrusion, of electric and electronic components, such as a connector, a printed circuit board, and a sealed molded article, car components, such as a lamp reflector and various electrical components, interior materials for various architecture, aircraft, and automobile, or precision components, such as OA equipment components, camera components, and watch components, or as a material for fiber or film.

EXAMPLES

Hereinafter, the present invention will be specifically described with respect to examples, but the present invention is not to be limited thereto.
(Measurement of Metal Atom Content)

In a platinum crucible, 100 mg of a PPS resin was weighed and 2 ml of conc. sulfuric acid was added thereto. This was placed on an electric heater and was subjected to thermal degradation until white smoke of sulfuric acid was no longer emitted. Then, the crucible with a degradation product was placed in an electric furnace and thermal degradation was performed at 800° C. for 3 hours, resulting in complete asking. The crucible was cooled and the content was washed out with 10 ml of a 1N hydrochloric acid into a measuring flask. Then, the resultant was washed out five times using 5 ml of distilled water each time into a 100 ml measuring flask, and diluted with distilled water in the measuring flask into a 100 ml diluted solution. The metal ion content in the obtained diluted solution was measured using an ICP optical emission spectrometer ("Optical Emission Spectrometer Optima 4300 DV" manufactured by PerkinElmer Japan Co. Ltd.) and a metal ion content except for sodium ions which were used as a polymerization raw material was recorded. The detection limit is 0.01 ppm.
(Measurement Method of Melt Viscosity)

The melt viscosity ($\eta$) of a PPS resin is a value measured with a flow tester ("CFT500D" manufactured by Shimadzu Corporation) after kept at 300° C., 1.96 MPa, L/D=10 (mm)/1 (mm) for 6 minutes.
(Determination of Amount of Phenol (by-Product))

10 g of the obtained PPS slurry and 0.2 g of an internal standard substance (chlorobenzene) were weighed and was diluted with 15 g of acetone. The obtained diluted solution was treated with ultrasonic waves for 5 minutes and subjected to solid-liquid separation with a centrifuge. Then, 1 µL of the supernatant was taken and analyzed by gas chromatography.

The analysis by gas chromatography was performed with a gas chromatography "GC2014" manufactured by Shimadzu Corporation (column: column "G300" manufactured by Chemical Evaluation and Research Institute, Japan, carrier gas: helium, measurement column condition: keep at 140° C. for 5 minutes→heat to 200° C. at 3° C./min→keep at 200° C. for 20 minutes). For determining the phenol concentration, a calibration line was first created with a standard sample. Next, a chromatogram obtained by measuring the supernatant prepared above was used to determine a peak area of the same retention time as that of the standard sample. The concentration in the measurement solution was determined based on the peak area and the calibration line, and the number of moles of phenol per mole of the sulfidizing agent (per mole of the total charged sulfur atoms) was calculated in percentage (hereinafter represented by "mol %/S").
(Determination of Amount of Water)

The amount of water was measured by a Karl Fisher volume titration method with a Karl Fisher moisture meter (AQV-300 manufactured by Hiranuma Inc.). Note that the detection limit is $6.0 \times 10^{-6}$ mol based on 1 mol of sulfur atoms.

Example 1

Dehydration Step (1)

Into an autoclave whose inner wall (liquid contact part) was formed of a nickel alloy (Ni—Cr—Mo alloy containing 45% by mass of chromium, 1% by mass of molybdenum, and the balance of nickel) and which was equipped with a thermometer, a heater, a titanium impeller, and a pressure gauge and was coupled to each of a raw material (NMP) storage tank, a decompression device (a pressure control valve, a vacuum pump, and a collection device of scattered hydrogen sulfide), and a distillation apparatus (a rectifying column, a condenser, and a decanter) were charged 220.5 parts by mass (1.50 parts by mole) of p-dichlorobenzene (hereinafter abbreviated as p-DCB), 29.7 parts by mass (0.3 parts by mole) of NMP, 123.6 parts by mass (1.5 parts by mole) of a 45 wt % NaSH aq., and 125.0 g (1.5 parts by mole) of a 48 wt % NaOH aq. at room temperature, and the autoclave in a sealed state was heated so that the liquid temperature became 145° C. with stirring under a nitrogen atmosphere.

Then, a valve on a pipe from the autoclave to the distillation apparatus was opened to start dehydration under the atmospheric pressure at a liquid temperature of 145° C. and the liquid temperature was monitored. When the liquid temperature reached 145° C.±2° C., dehydration was conducted while controlling an on/off switch of the heater to maintain the temperature within a certain width and controlling open-close of a valve on a pipe coupled to the decompression device to reduce the pressure from the atmospheric pressure to 47 [kPa abs].

A mixed vapor of water and p-DCB discharged from the rectifying column was condensed in the condenser and water and p-DCB were separated in the decanter. Water was distilled out of the system at any appropriate time and p-DCB was returned into the autoclave. When the total amount of all water which was distilled out of the system by dehydration reached 123.5 parts by mass, the valve on the pipe from the autoclave to the distillation apparatus was closed to complete the dehydration. The time of dehydration was 100 minutes in total. The content of the autoclave after the dehydration reaction was in a slurry state in which a particulate anhydrous sodium sulfate composition was dispersed in DCB and the amount of remaining water was 0.3 mol per mole of sulfur atoms present in the autoclave.

Polymerization Step

After the autoclave containing the mixture obtained by the dehydration step was brought under a nitrogen atmosphere, the valves were closed to seal the reaction system. The liquid temperature was made to 160° C. and 415.8 parts by mass (4.2 parts by mole) of NMP which was previously set in the raw material storage tank was pushed with the pump through a pipe by opening a valve coupled to the raw material storage tank to charge NMP in the autoclave. Then, the mixture was heated to 220° C. and stirred for 2 hours, and then was heated to 250° C. and stirred for 1 hour. The final pressure was 373 [kPa abs]. Then, the mixture was cooled to room temperature.

Post-Treatment Step

After cooling, the obtained slurry was poured into 3000 parts by mass of water, was stirred at 80° C. for 1 hour, and then was filtered. The cake was again stirred with 3000 parts by mass of hot water for 1 hour for washing and was filtered. This operation was repeated four times and after filtration, the cake was dried in a hot air drier at 120° C. overnight, thereby obtaining 154 parts by mass of white powder PPS.

The melt viscosity of this polymer was 66 Pa·s, the amount of phenol produced was 0.1% by mole, and the metal content of the sum of chromium, molybdenum, and nickel was the detection limit or lower.

Reference Example 1

Dehydration Step (1)

Into an autoclave whose inner wall (liquid contact part) was formed of nickel alloy (Ni—Cr—Mo alloy containing 45% by mass of chromium, 1% by mass of molybdenum, and the balance of nickel) and which was equipped with a thermometer, a heater, a titanium impeller, and a pressure gauge and was coupled to each of a raw material (NMP) storage tank, a decompression device (a pressure control valve, a vacuum pump, and a collection device of scattered hydrogen sulfide), and a distillation apparatus (a rectifying column, a condenser, and a decanter) were charged 220.5 parts by mass (1.50 parts by mole) of p-dichlorobenzene (hereinafter abbreviated as p-DCB), 29.7 parts by mass (0.3 parts by mole) of NMP, 123.6 parts by mass (1.5 parts by mole) of a 45 wt % NaSH aq., and 125.0 g (1.5 parts by mole) of a 48 wt % NaOH aq., and the autoclave in a sealed state was heated so that the liquid temperature became 128° C. with stirring under a nitrogen atmosphere.

Next, while a valve on a pipe from the autoclave to the distillation apparatus was opened to start dehydration, a valve on a pipe coupled to the decompression device was opened, and while reducing the pressure from the atmospheric pressure to [kPa abs] at a rate of −6.6 [kPa abs]/min, the liquid temperature was gradually increased from 128° C. to 147° C. at a rate of 0.1° C./min, and finally, dehydration was conducted at a pressure of 47 [kPa abs] and a liquid temperature of 147° C. for 4 hours. A mixed vapor of water and p-DCB discharged from the rectifying column was condensed in the condenser and water and p-DCB were separated in the decanter. Water was distilled out of the system at any appropriate time and p-DCB was returned into the autoclave. During that, the amount of water distilled was 123.5 parts by mass, the content of the autoclave after the dehydration reaction was in a slurry state in which a particulate anhydrous sodium sulfate composition was dispersed in DCB, and the amount of remaining water present at the time was 0.3 mol per mole of sulfur atoms present in the autoclave.

Polymerization Step

After the autoclave containing a mixture obtained by the dehydration step was brought under a nitrogen atmosphere, the valves were closed to seal the reaction system. The liquid temperature was made to 160° C. and 415.8 parts by mass (4.2 parts by mole) of NMP which was previously set in the raw material storage tank was pushed with the pump through a pipe by opening a valve coupled to the raw material storage tank to charge NMP in the autoclave. Then, the mixture was heated to 220° C. and stirred for 2 hours, and then was heated to 250° C. and stirred for 1 hour. The final pressure was 373 [kPa abs]. Then, the mixture was cooled to room temperature.

Post-Treatment Step

After cooling, the obtained slurry was poured into 3000 parts by mass of water, was stirred at 80° C. for 1 hour, and then was filtered. The cake was again stirred with 3000 parts by mass of hot water for 1 hour for washing and was filtered. This operation was repeated four times and after filtration, the cake was dried in a hot air drier at 120° C. overnight, thereby obtaining 154 parts by mass of white powder PPS.

The melt viscosity of this polymer was 66 Pa·s, the amount of phenol produced was 0.08% by mole, and the metal content of the sum of chromium, molybdenum, and nickel was the detection limit or lower.

Comparative Example 1

The same operation as in Example 1 was performed except that the part " . . . , and the autoclave in a sealed state was heated so that the liquid temperature became 145° C. with stirring under a nitrogen atmosphere. Then, a valve on a pipe from the autoclave to the distillation apparatus was opened to start dehydration under the atmospheric pressure at a liquid temperature of 145° C. and the liquid temperature was monitored. When the liquid temperature reached 145° C.±2° C., dehydration was conducted while controlling an on/off switch of the heater to maintain the temperature within a certain width and controlling open-close of a valve on a pipe coupled to the decompression device to reduce the pressure from the atmospheric pressure to 47 [kPa abs]." was changed to " . . . , and the autoclave in a sealed state was heated so that the liquid temperature became 173° C. with stirring under a nitrogen atmosphere. Then, a valve on a pipe from the autoclave to the distillation apparatus was opened to start dehydration under the atmospheric pressure at a liquid temperature of 173° C. and the liquid temperature was monitored. When the liquid temperature reached 173° C.±2° C., dehydration was conducted while controlling an on/off switch of the heater to maintain the temperature within a certain width (±5° C.)".

In the dehydration step (1), when the total amount of all water distilled out of the system by dehydration reached 123.5 parts by mass, the valve on the pipe from the autoclave to the distillation apparatus was closed to complete the dehydration. The time of the dehydration was 280 minutes in total. The content of the autoclave after the dehydration reaction was in a slurry state in which a particulate anhydrous sodium sulfate composition was dispersed in DCB, and the amount of remaining water was 0.28 mol per mole of sulfur atoms present in the autoclave.

In addition, after the post-treatment step, the melt viscosity of the obtained PPS resin was 67 Pa·s, and the amount of phenol produced was 0.08% by mole, and the total metal content of the sum of chromium, molybdenum, and nickel was 23 ppm.

Comparative Example 2

Basically the same operation as in Example 1 was performed except that the part "Then, a valve on a pipe from the autoclave to the distillation apparatus was opened to start dehydration under the atmospheric pressure at a liquid temperature of 145° C. and the liquid temperature was monitored. When the liquid temperature reached 145° C.±2° C., dehydration was conducted while controlling an on/off switch of the heater to maintain the temperature within a certain width and controlling open-close of a valve on a pipe coupled to the decompression device to reduce the pressure from the atmospheric pressure to 47 [kPa abs]." was changed to "Then, a valve on a pipe from the autoclave to the distillation apparatus was opened to start dehydration under the atmospheric pressure at a liquid temperature of 145° C. and the liquid temperature was monitored. When the liquid temperature reached 145° C.±2° C., dehydration was conducted while controlling an on/off switch of the heater to maintain the temperature within a certain width (±5° C.)."

However, in the dehydration step (1), when the time of dehydration reached 100 minutes in total, the valve of the pipe from the autoclave to the distillation apparatus was closed to complete the dehydration. The total amount of all water distilled out of the system by dehydration was 49.5 parts by mass. The content of the autoclave after the dehydration reaction was in a slurry state in which a particulate anhydrous sodium sulfate composition was dispersed in DCB, and the amount of remaining water was 3 mol per mole of sulfur atoms present in the autoclave.

However, after the post-treatment step, no white powder PPS resin was obtained and a low viscosity product remained. The product had low viscosity and the melt viscosity could not be measured. Note that the amount of phenol produced was 0.5% by mole, and the total metal content of the sum of chromium, molybdenum, and nickel was 0.1 ppm.

Example 2

Basically the same operation as in Example 1 was performed except that the part "an autoclave whose inner wall (liquid contact part) was formed of a nickel alloy (Ni—Cr—Mo alloy containing 45% by mass of chromium, 1% by mass of molybdenum, and the balance of nickel)" was changed to "an autoclave whose inner wall (liquid contact part) was formed of titanium".

In the dehydration step (1), when the total amount of all water distilled out of the system by dehydration reached 123.5 parts by mass, the valve on the pipe from the autoclave to the distillation apparatus was closed to complete the dehydration. The content of the autoclave after the dehydration reaction was in a slurry state in which a particulate anhydrous sodium sulfate composition was dispersed in DCB, and the amount of remaining water was 0.29 mol per mole of sulfur atoms present in the autoclave.

In addition, after the post-treatment step, the melt viscosity of the obtained PPS resin was 67 Pa·s, the amount of phenol produced was 0.08% by mole, and the titanium metal content was the detection limit or lower.

Comparative Example 3

The same operation as in Comparative Example 1 was performed except that the part "an autoclave whose inner wall (liquid contact part) was formed of a nickel alloy (Ni—Cr—Mo alloy containing 45% by mass of chromium, 1% by mass of molybdenum, and the balance of nickel)" was changed to "an autoclave whose inner wall (liquid contact part) was formed of titanium".

In the dehydration step (1), when the total amount of all water distilled out of the system by dehydration reached 123.5 parts by mass, the valve on the pipe from the autoclave to the distillation apparatus was closed to complete the dehydration. The content of the autoclave after the dehydration reaction was in a slurry state in which a particulate anhydrous sodium sulfate composition was dispersed in DCB, and the amount of remaining water was 0.27 mol per mole of sulfur atoms present in the autoclave.

In addition, after the post-treatment step, the melt viscosity of the obtained PPS resin was 65 Pa·s, the amount of phenol produced was 0.09% by mole, and the titanium metal content was 5 ppm.

Comparative Example 4

The same operation as in Comparative Example 2 was performed except that the part "an autoclave whose inner wall (liquid contact part) was formed of a nickel alloy (Ni—Cr—Mo alloy containing 45% by mass of chromium, 1% by mass of molybdenum, and the balance of nickel)" was changed to "an autoclave whose inner wall (liquid contact part) was formed of titanium".

In the dehydration step (1), when the time of dehydration reached 100 minutes in total, the valve of the pipe from the autoclave to the distillation apparatus was closed to complete the dehydration. The total amount of all water distilled out of the system by dehydration was 50.2 parts by mass. The content of the autoclave after the dehydration reaction was in a slurry state in which a particulate anhydrous sodium sulfate composition was dispersed in DCB, and the amount of remaining water was 2.8 mol per mole of sulfur atoms present in the autoclave.

However, after the post-treatment step, no white powder PPS resin was obtained and a low viscosity product remained. The product had low viscosity and the melt viscosity could not be measured. Note that the mount of phenol produced was 0.5% by mole, and the total metal content of the sum of chromium, molybdenum, and nickel was 2 ppm.

Example 3

The same operation as in Example 1 was performed except that the part " . . . , and the autoclave in a sealed state was heated so that the liquid temperature became 145° C. with stirring under a nitrogen atmosphere.

Then, a valve on a pipe from the autoclave to the distillation apparatus was opened to start dehydration under the atmospheric pressure at a liquid temperature of 145° C. and the liquid temperature was monitored. When the liquid temperature reached 145° C.±2° C., dehydration was conducted while controlling an on/off switch of the heater to maintain the temperature within a certain width and controlling open-close of a valve on a pipe coupled to the decompression device to reduce the pressure from the atmospheric pressure to 47 [kPa abs]." was changed to " . . . , and the autoclave in a sealed state was heated so that the liquid temperature became 115° C. with stirring under a nitrogen atmosphere. Then, a valve on a pipe from the autoclave to the distillation apparatus was opened to start dehydration under the atmospheric pressure at a liquid temperature of 115° C. and the liquid temperature was monitored. When the liquid temperature reached 115° C.±2° C., dehydration was conducted while controlling an on/off switch of the heater to maintain the temperature within a certain width (±5° C.) and controlling open-close of a valve on a pipe coupled to the decompression device to reduce the pressure from the atmospheric pressure to 32 [kPa abs]".

In the dehydration step (1), when the total amount of all water distilled out of the system by dehydration reached 123.5 parts by mass, the valve on the pipe from the autoclave to the distillation apparatus was closed to complete the dehydration. The content of the autoclave after the dehydration reaction was in a slurry state in which a particulate anhydrous sodium sulfate composition was dispersed in DCB, and the amount of remaining water was 0.3 mol per mole of sulfur atoms present in the autoclave.

In addition, after the post-treatment step, the melt viscosity of the obtained PPS resin was 62 Pa·s, the amount of phenol produced was 0.09% by mole, and the total metal content of the sum of chromium, molybdenum, and nickel was the detection limit or lower.

Example 4

The same operation as in Example 1 was performed except that the part", and the autoclave in a sealed state was heated so that the liquid temperature became 145° C. with stirring under a nitrogen atmosphere. Then, a valve on a pipe from the autoclave to the distillation apparatus was opened to start dehydration under the atmospheric pressure at a liquid temperature of 145° C. and the liquid temperature was monitored. When the liquid temperature reached 145° C.±2° C., dehydration was conducted while controlling an on/off switch of the heater to maintain the temperature within a certain width and controlling open-close of a valve on a pipe coupled to the decompression device to reduce the pressure from the atmospheric pressure to 47 [kPa abs]." was changed to " . . . , and the autoclave in a sealed state was heated so that the liquid temperature became 155° C. with stirring under a nitrogen atmosphere. Then, a valve on a pipe from the autoclave to the distillation apparatus was opened to start dehydration under the atmospheric pressure at a liquid temperature of 155° C. and the liquid temperature was monitored. When the liquid temperature reached 155° C.±2° C., dehydration was conducted while controlling an on/off switch of the heater to maintain the temperature within a certain width (±5° C.) and controlling open-close of a valve on a pipe coupled to the decompression device to reduce the pressure from the atmospheric pressure to 70 [kPa abs]".

In the dehydration step (1), when the total amount of all water distilled out of the system by dehydration reached 123.5 parts by mass, the valve on the pipe from the autoclave to the distillation apparatus was closed to complete the dehydration. The content of the autoclave after the dehydration reaction was in a slurry state in which a particulate anhydrous sodium sulfate composition was dispersed in DCB, and the amount of remaining water was 0.3 mol per mole of sulfur atoms present in the autoclave.

In addition, after the post-treatment step, the melt viscosity of the obtained PPS resin was 65 Pa·s, the amount of phenol produced was 0.09% by mole, and the total metal content of the sum of chromium, molybdenum, and nickel was the detection limit or lower.

The invention claimed is:
1. A method for producing a polyarylene sulfide resin in which a dihaloaromatic compound is reacted with a sulfidizing agent in the presence of an aliphatic cyclic compound having a ring openable by hydrolysis,
the method comprising a dehydration step (1) in which in the presence of a dihaloaromatic compound, a water-containing sulfidizing agent and an aliphatic cyclic compound having a ring openable by hydrolysis are heated to a liquid temperature in the range of 90° C. or higher and 170° C. or lower under the atmospheric pressure and then dehydration is performed while maintaining the liquid temperature and reducing pressure to a pressure in the range of 30 [kPa abs] or higher and 80 [kPa abs] or lower to thus obtain a mixture.

2. The production method according to claim 1, wherein the dihaloaromatic compound is in an amount in the range of 0.2 mol or more and 5.0 mol or less based on 1 mol of total sulfur atoms in the sulfidizing agent.

3. The production method according to claim 1, wherein water present in a reaction system at the time after completion of the dehydration step (1) is in an amount in the range of 0.4 mol or less based on 1 mol of total sulfur atoms in the sulfidizing agent.

4. The production method according to claim 1, wherein the aliphatic cyclic compound is in an amount in the range of 0.01 mol or more and 0.9 mol or less based on 1 mol of total sulfur atoms in the sulfidizing agent.

5. The production method according to claim 1, wherein the sulfidizing agent is an alkali metal sulfide, or an alkali metal hydrosulfide and an alkali metal hydroxide.

6. The production method according to claim 1, wherein after completion of the dehydration step (1), the mixture is a slurry containing a solid anhydrous sulfidizing agent.

7. The production method according to claim 1, further comprising a polymerization step in which the mixture obtained through the dehydration step (1) is heated with an amount of water present at the time in a reaction system in the range of 0.4 mol or less based on 1 mol of the dihaloaromatic compound to perform a polymerization reaction.

8. The production method according to claim 1, subsequently comprising a dehydration step (2) in which an aprotic polar organic solvent is further added to the mixture obtained through the dehydration step (1) and water is removed by distillation to perform dehydration,
and further subsequently comprising a polymerization step in which a mixture obtained by the dehydration step (2) is subjected to a polymerization reaction with an amount of water present at the time in a reaction system that is less than 0.03 mol based on 1 mol of the dihaloaromatic compound.

9. The production method according to claim 1, wherein in the dehydration step (1), a contact part of a reaction apparatus with raw materials or a mixture obtained after a reaction is formed of at least one material selected from the group consisting of titanium, zirconium, and nickel alloy.

10. A method for producing a polyarylene sulfide resin composition, comprising
a step of producing a polyarylene sulfide resin by the production method according to claim 1, and
a step of blending the obtained polyarylene sulfide resin with at least one other component selected from the group consisting of a filler, a thermoplastic resin other than the polyarylene sulfide resin, an elastomer, a crosslinkable resin having two or more functional groups, and a silane coupling agent, heating the blend to a melting point of the polyarylene sulfide resin or higher, and melt-kneading the mixture.

11. A method for producing a polyarylene sulfide resin molded article, the method comprising a step of producing a polyarylene sulfide resin composition by the production method according to claim 10, and a step of subjecting the obtained polyarylene sulfide resin composition to melt-molding.

\* \* \* \* \*